(12) United States Patent
Massoudi et al.

(10) Patent No.: US 9,251,432 B2
(45) Date of Patent: Feb. 2, 2016

(54) METHOD AND APPARATUS FOR OBTAINING A SYMMETRY INVARIANT DESCRIPTOR FROM A VISUAL PATCH OF AN IMAGE

(75) Inventors: Ayoub Massoudi, Angers (FR); Simon Dolle, Issy les Moulineaux (FR); Alexandre Winter, Brooklyn, NY (US); Frederic Jahard, Vincennes (FR); Pierre Moulon, Antony (FR); Christian Wengert, Zurich (CH)

(73) Assignee: JASTEC CO., Tokyo (JP)

( * ) Notice: Subject to any disclaimer, the term of this patent is extended or adjusted under 35 U.S.C. 154(b) by 345 days.

(21) Appl. No.: 13/808,334

(22) PCT Filed: Jul. 6, 2010

(86) PCT No.: PCT/IB2010/002139
§ 371 (c)(1),
(2), (4) Date: Jul. 10, 2013

(87) PCT Pub. No.: WO2012/004626
PCT Pub. Date: Jan. 12, 2012

(65) Prior Publication Data
US 2013/0301932 A1 Nov. 14, 2013

(51) Int. Cl.
*G06K 9/46* (2006.01)
*G06K 9/62* (2006.01)

(52) U.S. Cl.
CPC ............ *G06K 9/4671* (2013.01); *G06K 9/6211* (2013.01)

(58) Field of Classification Search
CPC ........................... G06K 9/6211; G06K 9/4671
USPC ........................................................ 382/203
See application file for complete search history.

(56) References Cited

U.S. PATENT DOCUMENTS

| | | | |
|---|---|---|---|
| 6,650,778 B1 * | 11/2003 | Matsugu et al. | 382/209 |
| 6,711,293 B1 * | 3/2004 | Lowe | 382/219 |
| 7,382,897 B2 * | 6/2008 | Brown et al. | 382/103 |
| 2010/0080469 A1 * | 4/2010 | Liu et al. | 382/201 |
| 2010/0124377 A1 * | 5/2010 | Yu et al. | 382/224 |
| 2011/0106805 A1 * | 5/2011 | Bao et al. | 707/737 |
| 2011/0205338 A1 * | 8/2011 | Choi et al. | 348/46 |
| 2011/0286628 A1 * | 11/2011 | Goncalves et al. | 382/103 |

OTHER PUBLICATIONS

Guo et al., "MIFT: A Mirror Reflection Invariant Feature Descriptor", Sep. 23, 2009, Computer Vision A ACCV 2009, Springer Berling Heidelberg, Berlin, Heidelberg, pp. 536-545, XP019141306.
Lowe, "Distinctive Image Features from Scale-Invariant Keypoints", J. Comp. Vision, vol. 60, Apr. 20, 2001, pp. 91-110.
Loy et al., "Detecting Symmetry and Symmetric Constellations of Features", ECCV 2006, vol. 3951, pp. 508-521.
Ma et al., "MISIFT: Mirror and Inversion Invariant Generalization for SIFT Descriptor", Proceedings of the ACM International Conference on Image and Video Retrieval, Jul. 5, 2010, Jul. 7, 2010, pp. 228-235, XP7918135.
International Search Report and Written Opinion dated Apr. 7, 2011, corresponding to PCT Application No. PCT/IB2010/002139, filed Jul. 6, 2010.

* cited by examiner

*Primary Examiner* — Samir Ahmed
(74) *Attorney, Agent, or Firm* — Oliff PLC

(57) ABSTRACT

The present invention concerns a method for deriving from an arbitrary local image descriptor a descriptor that is invariant under arbitrary mirror symmetries. For a point of interest, pi, for which the descriptor is to be determined a direction, ODi is determined. The local patch from which the descriptor is to be extracted is mirrored along ODi if a "smaller than" relation does not hold a feature extracted from the left half of the local image patch, in regard of ODi, compared to the right half of the local image patch. Thereby, the local patch is brought into a normalized intrinsic orientation. Thereafter, the descriptor is extracted. Examples include a mirror symmetry invariant version of Lowe's SIFT.

13 Claims, 3 Drawing Sheets

Figure 1:
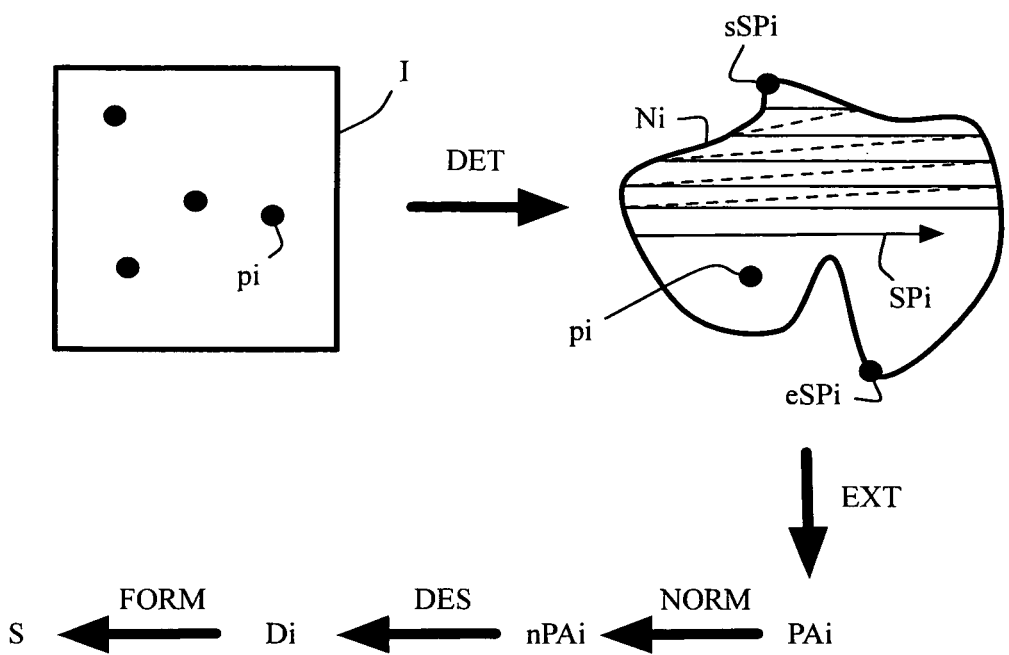

METHOD AND APPARATUS FOR OBTAINING A SYMMETRY INVARIANT DESCRIPTOR FROM A VISUAL PATCH OF AN IMAGE

The present invention concerns a method and apparatus for obtaining an arbitrary axial symmetry (or mirroring) invariant descriptor from a visual patch around a detected point of interest of an image, said descriptor being obtained by scanning the visual patch according to a scanning path.

Because of the rapid growth of networks and the fast evolution of content sharing solutions, people are getting more and more easy access to a variety of image (still image or video) in an 'Anytime, Anywhere' basis.

This fact raises the challenge of data traceability and authentication. Indeed, an image has a cultural and commercial value at the same time. On one hand, from the cultural point of view, the traceability of image (or video) can be of great interest in database search. This can be useful in history, human science or any other research field. It could be interesting to analyze viewing statistics of a given political speech or documentary film . . . Thus traceability is an important feature that contributes to the enrichment of image (or video) by making its indexing and retrieval more efficient and exploitable. On the other hand, digital content producers, distributors as well as copyright holders are careful to guarantee the traceability of their content and protect their commercial rights on distributed content.

The aim of image (or video) traceability (or authentication) can be, for example, copyright enforcement in order that copyright holders know where and how their image (or video) are used, monitoring which consists in supervising a multimedia content (web, magazines, newspapers, TV . . . ) and detects any usage of a given multimedia content, or copy detection which consists in identifying an original multimedia content. The main difference between monitoring and copy detection is the nature of transformations that are managed. Indeed, monitoring usually handles soft distortions whereas copy detection handles strong attacks.

The present invention is in the technical field of image indexing and retrieval. That includes both local based image indexing and retrieval in which a global descriptor is obtained for retrieval and local based image indexing and retrieval in which a plurality of descriptors are obtained. This field includes also video indexing and retrieval since image indexing may be applied on individual video frames.

In local based image indexing, points of interest (or interchangeably keypoints or regions of interest) are detected in the image. Next, a visual patch around each detected point of interest is extracted from the image, and a local descriptor is obtained for each point of interest by scanning the extracted patch according to a scanning path. The set of all these local descriptors form an image (or video) signature. The signature is then stored in a particular structure, usually called reference signatures database, for further retrieval.

In the local based image (or video) retrieval, given a query image, the same points of interest detection and description process is performed on the query image and each local descriptor obtained from the query image is individually compared to a local descriptor of each signature stored in the reference signatures database.

Several methods have been proposed for obtaining local descriptors, all of them perform a number of normalizations of the extracted patch in order for the local descriptor to be invariant against a defined set of transformations (rotation, scaling, affine transformation . . . ).

However, all of these existing methods fail against arbitrary mirroring.

A first approach to get an arbitrary axial symmetry invariant descriptor is to index the extracted patch and a mirrored version of this patch (Loy et al., "Detecting symmetry and symmetric Constellations of features", ECCV 2006, Part II, LNCS 3951, pp. 508-521). But, because two local descriptors for each extracted patch are stored, this approach doubles the size of the reference signatures database and thus adversely impacts the retrieval speed.

Another approach to yield mirroring invariance is to index an extracted patch, and if the retrieval fails, then to index its mirrored version. This approach increases both indexing phase and retrieval computation times.

The problem solved by the present invention is to obtain an arbitrary axial symmetry invariant descriptor from a visual patch around a detected point of interest of an image, said descriptor being extracted by scanning the visual patch according to a scanning path.

To this aim, the present invention concerns a method which obtains an orientation direction of the point of interest, computes a polarity of the point of interest which defines the location of the scanning path starting point from the orientation direction, and if the computed polarity does not conform to a predefined polarity, mirrors the extracted visual patch with respect to the orientation direction.

The method, thus, obtains an orientation and a polarity (or spin) for the detected point of interest. The polarity can be regarded as a local compass that determines the location of the starting point of the scanning path: Orientation defines a "left" of the extracted patch while polarity defines a "top" of that patch. Thus, the predefined polarity is relative to a non-mirrored version of the image. When the image is mirrored with respect to an arbitrary symmetry axis, both the computed orientation and polarity change and the extracted path is then mirrored with respect to the orientation direction to obtain same descriptors.

This normalization of the extracted visual patch is independent of the method used for the detection of the points of interest and of the definition of the descriptor (of the method to obtain the descriptor from a scanning of the extracted patch). Thus, the method may be combined with any other normalization method of an extracted patch which leads to a local or global descriptor which is invariant against a defined set of transformations (rotation, scaling, affine transformation . . . ).

Normalizing the visual patch according to the present invention before descriptor computation avoids storing two descriptors per patch (mirrored and non mirrored versions). The storing memory of the reference signature database does not increase, and hence the introduction of an arbitrary axial symmetry invariant descriptor in a retrieval process will not lead to an increase of the indexing/retrieval computation time compared to indexing and/or retrieval based on non axial symmetry invariant descriptors.

According to an embodiment, a polarity of the point of interest is computed by dividing the visual patch into a plurality of parts and by computing statistical features from these parts, said statistical features defining the location of the scanning path starting point from the orientation direction.

According to a preferred embodiment, the visual patch is divided into two non-overlapping parts separated by the orientation direction, a couple of features is computed from these two non-overlapping parts, a hierarchical relation between the two computed features of said couple is defined, and the computed polarity does not conform to the predefined polarity when the two computed features which defined said computed polarity do not check said hierarchical relation.

This leads to a lightweight normalization method in term of computation time.

According to an embodiment, the visual patch is extracted from the image by a rotation invariant detector, the orientation direction is then obtained from an orientation angle resulting from the rotation invariant detector, and the features are computed once the extracted patch has been aligned with the orientation direction.

This is advantageous because this avoids the computation of a specific orientation direction for the point of interest, reducing then the computation time for indexing the image.

Alternatively, the visual patch is extracted from the image by a rotation invariant detector, the orientation direction is then obtained from a process which is independent of the detector, and the features are computed once the extracted patch has been aligned with the orientation angle resulting of the rotation invariant detector.

According to another aspect, the present invention concerns also an image indexing method in which at least one point of interest of the image is detected and a descriptor is obtained for each detected point of interest by scanning an extracted patch around said detected point of interest according to a scanning path. The method is characterized in that the extracted patch is normalized according to the above-mentioned method to obtain an arbitrary axial symmetry invariant descriptor.

According to an embodiment, a single point of interest is extracted from the image. This leads to a global description of the image.

Preferably, multiple points of interest are extracted from the image, leading to a local description of the image.

This is advantageous because local based image retrieval provides better retrieval performance compared to global based image retrieval.

According to another aspect, the present invention concerns also an image retrieval method in which a signature of a query image and/or a previously stored signature of an image is/are formed by at least one descriptor which has been normalized according to the above-mentioned method to obtain an arbitrary axial symmetry invariant descriptor.

According to yet another aspect, the present invention concerns also an apparatus which comprises means for implementing the above-mentioned method to obtain an arbitrary axial symmetry invariant descriptor, and an apparatus which comprises means for implementing the above-mentioned indexing and/or retrieval methods.

Figure 2:
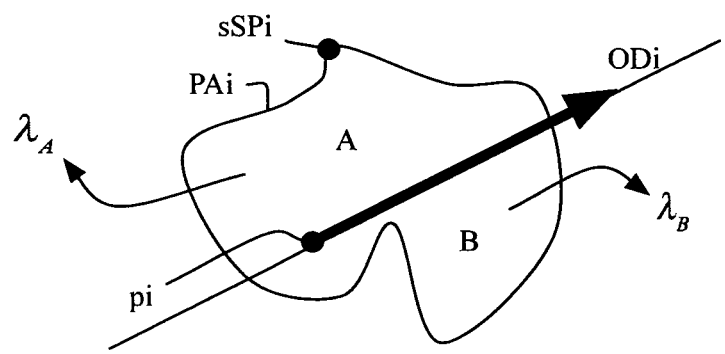
Figure 3:
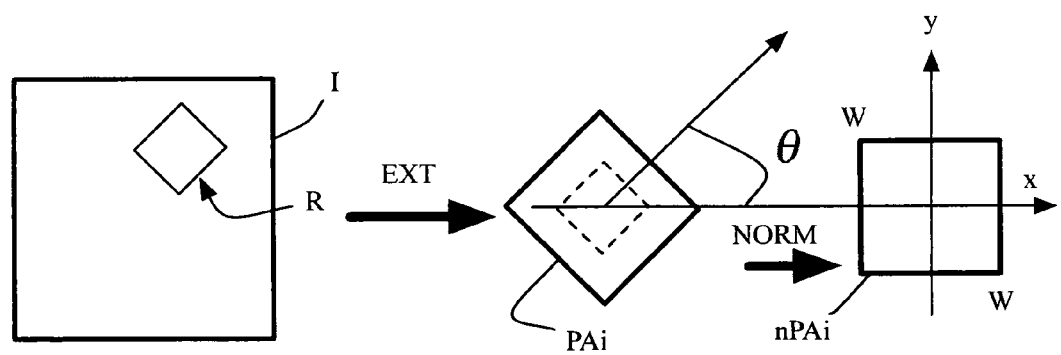
Figure 4:
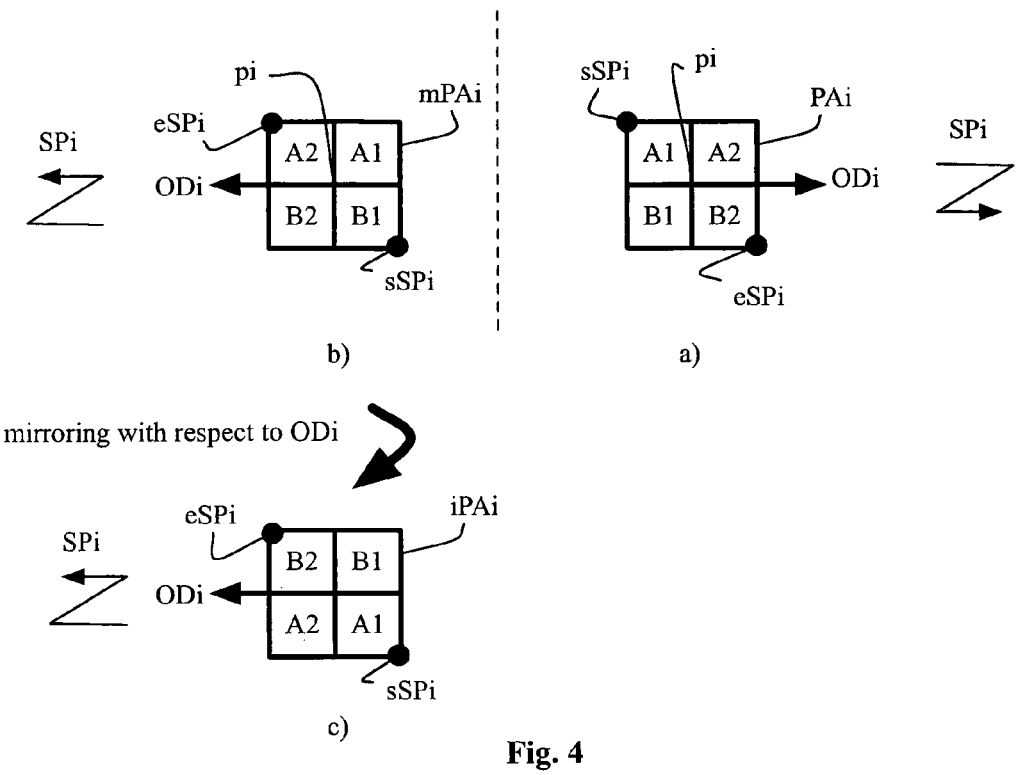
Figure 5:
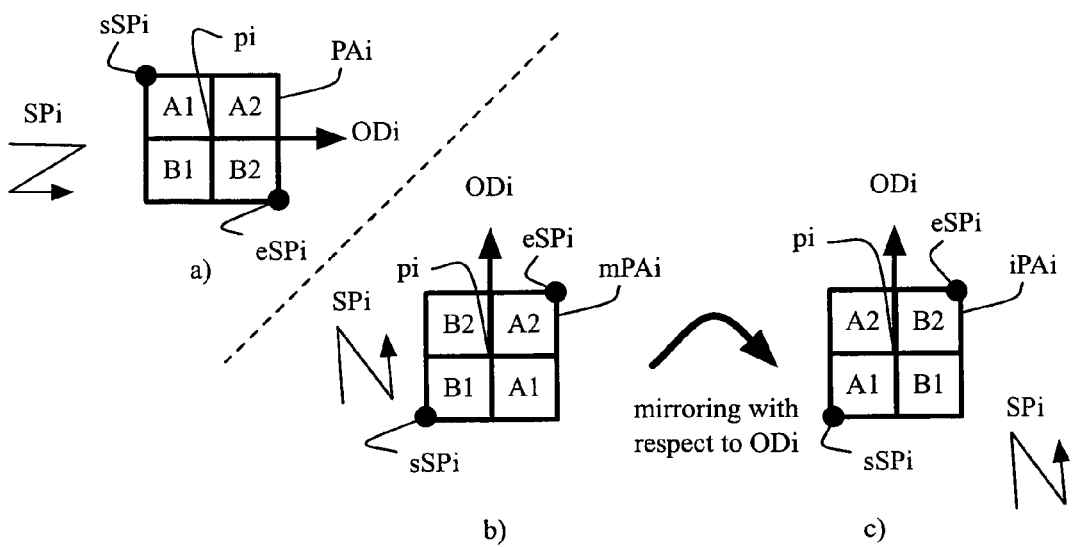

The characteristics of the invention mentioned above, as well as others, will emerge more clearly from a reading of the following description given in relation to the accompanying figures, amongst which:

FIG. 1 shows an illustration of a method for computing a local descriptor of an image, FIG. 2 shows an example of an orientation and polarity of a detected point of interest, FIG. 3 shows a illustration of a rotation invariant detector, and FIG. 4 and FIG. 5 show examples of application of the present invention on mirrored version of an image.

In the following, the method is described for computing a local based signature of an image but this method may be easily extended to compute a global based signature of said image: in that latter case, the signature equals a single descriptor which describes the whole image to index.

A method for computing a local based signature S of an image I (or a video) is illustrated in FIG. 1. When a video is indexed, the signature S is computed from an aggregation of individual signatures of selected frames from that video.

First, at least one point of interest pi is detected from the image (step DET).

A neighbourhood Ni around each detected point of interest pi and a scanning path SPi are then defined. The neighbourhood Ni may have any shape and the constraints on the scanning path SPi are to start from a starting point sSPi, to consider each pixel location of the image which belongs to the neighbourhood Ni and ends at a point eSPi.

Next, a visual patch PAi is extracted from the image for each neighbourhood Ni (step EXT). The patch PAi is then possibly normalized (step NORM) and a descriptor Di is obtained by scanning the patch PAi (or the normalized patch nPAi) according to the scanning path SPi (step DES). When the patch PAi is normalized, the descriptor Di is invariant against a defined set of transformations (rotation, scaling, and/or affine transformation . . . ).

The signature S of the image I is then formed by gathering all the local descriptors Di (step FORM). This signature S may be used for image indexing and retrieval as explained in the introducing part.

Any known detection method may be used for detecting points of interest in an image and any known method may be used to extract a descriptor by scanning the visual patch according to a scanning path.

The method according to the present invention is applied to each visual patch PAi (or each normalized patch nPAi) in order to obtain an arbitrary axial symmetry invariant descriptor Di relative to a point of interest pi.

The method obtains an orientation direction ODi of the point of interest pi as illustrated in FIG. 2, computes a polarity Poi of pi which defines the location of the scanning path starting point sSPi from the orientation direction ODi and if the computed polarity Poi does not conform to a predefined polarity pPoi, mirrors the visual patch PAi (or nPAi) with respect to the orientation direction ODi.

In an embodiment of this invention, and without loss of generality, the polarity Poi is computed by dividing the visual patch into a plurality of parts and computing statistical features from these parts, said statistical features defining the location of the scanning path starting point sSPI from the orientation direction ODi.

According to a preferred embodiment, a polarity is defined by computing a couple of features $(\lambda_A, \lambda_B)$ from two non-overlapping parts A and B of the visual patch PAi (or nPAi) separated by the orientation direction ODi and a hierarchical relation between the two computed features $\lambda_A$ and $\lambda_B$.

In FIG. 2, the feature $\lambda_A$ is computed from the part A and the feature $\lambda_B$ is computed from the part B. The predefined polarity of the point of interest pi (which is relative to a non-mirrored image) defines that the starting point sSPi of the scanning path SPi is located on the left of the orientation direction ODi (in the part A). Then, a computed polarity Poi of the point of interest pi is considered as being not conform to the predefined polarity pPoi when the two computed features $\lambda_A$ and $\lambda_B$ which defined said computed polarity Poi do not check said hierarchical relation.

In one of its simplest definition of polarity, the feature $\lambda_A$, respectively $\lambda_B$, is the gray level average value of pixels belonging to the part A, respectively part B and the hierarchical relation is the result of a comparison between these two values ($\lambda_A$ is greater than the feature $\lambda_B$ for example for the predefined polarity).

The method may be implemented independently to the shape of the patch. However, in practice, it is usual to use rectangular or square patch PAi because an image is a matrix of pixels. This reduces the complexity of the algorithm for scanning the patch.

For illustrative purpose and without any limitation of the scope of the present invention, FIG. 4 and FIG. 5 show examples of a square visual patch PAi (or nPAi) centred at a point of interest pi and extracted from an image I and a square visual patch mPAi centred at the same point of interest pi and extracted from a mirrored version of the image I. Note that, usually, the visual patch is first rotated and aligned to the orientation direction ODi which is here oriented to the right by convention. A lexicographic scanning path SPi is used, i.e. the starting point sSPi is the top-left pixel of the patch PAi (or nPAi) and the end point eSPi is the bottom-right pixel of the patch (FIG. 4a and FIG. 5a). These constraints are not mandatory and are only used for simplicity of the drawings. Moreover, in order to show the symmetry of visual content of the patch, each patch has been split into four sub-regions: A1, A2 the union of which equals to the part A and B1, B2 the union of which equals the part B. According to this example, the starting point sSPi is the left corner of the upper part (part located at the left of the oriented direction ODi).

In FIG. 4, assuming the patch PAi has been extracted from an image and the patch mPAi has been extracted from a vertical symmetric image, an orientation direction ODi is computed from the patch PAi. The reference polarity pPoi of the point of interest pi is here relative to the patch PAi: the feature $\lambda_A$ is, for example, the gray level average value computed over the part located at the top of the oriented direction ODi, here on A1 and A2, the feature $\lambda_B$ is the gray level average value computed over the part located at the bottom of the oriented direction ODi, here on B1 and B2 and $\lambda_A > \lambda_B$. Scanning the patch according to the scanning path SPi leads to read the pixels of A1, A2, B1 and B2.

Because the content of the patch mPAi has been mirrored with respect to a vertical axis, scanning path SPi leads to read the pixels of B1, B2, A1, A2 (the starting point sSPi is the bottom right corner of the part located at the bottom of the oriented direction ODi). This leads to a descriptor which is different of the descriptor obtained from the patch PAi. Consequently, the image I and its mirrored version will never match.

According to the present invention, the polarity of the point of interest pi relative to the patch mPAi is computed: the feature $\lambda_A$ is the gray level average value computed over the part located at the top of the oriented direction ODi, here on B1 and B2, the feature $\lambda_B$ is the gray level average value computed over the part located at the bottom of the oriented direction ODi, here on A1 and A2 and thus $\lambda_A < \lambda_B$. The computed polarity Poi does not conform to the predefined polarity pPoi and the visual patch mPAi is then mirrored with respect to the orientation direction ODi as illustrated in FIG. 4c). Scanning the patch iPAi according to the scanning path SPi leads now to read the pixels of A1, A2, B1 and B2 and to a descriptor equals to the descriptor obtained from the image I.

In FIG. 5, assuming the patch PAi has been extracted from an image and the patch mPAi has been extracted from a diagonal symmetric image, an orientation direction ODi is computed from the patch PAi, and the reference polarity pPoi of the point of interest pi is here relative to the patch PAi and computed as in FIG. 4.

Because the content of the patch mPAi has been mirrored with respect to a diagonal axis, scanning path SPi leads to read the pixels of B1, B2, A1 and A2 and thus to a descriptor which is different of the descriptor obtained from the patch PAi. Consequently, the image I and its mirrored version will never match.

According to the present invention, the polarity of the point of interest pi relative to the patch mPAi is computed: the feature $\lambda_A$ is the gray level average value computed over the part located at the top of the oriented direction ODi, here on B1 and B2, the feature $\lambda_B$ is the gray level average value computed over the part located at the bottom of the oriented direction ODi, here on A1 and A2 and thus $\lambda_A < \lambda_B$. The computed polarity Poi does not conform to the predefined polarity pPoi and the visual patch mPAi is then mirrored with respect to the orientation direction ODi as illustrated in FIG. 5c. Scanning the patch iPAi according to the scanning path SPi leads now to read the pixels of A1, A2, B1 and B2 and to a descriptor equals to the descriptor obtained from the image I.

The method then obtains an arbitrary axial symmetry invariant descriptor from a visual patch.

In a preferred embodiment, the visual patch is extracted from the image by a rotation invariant detector. The orientation direction of the detected point of interest pi is then obtained from an orientation angle θ resulting from the rotation invariant detector, and the features (or the couple of features according to an embodiment) are computed once the extracted patch has been aligned with the orientation angle.

A DOG detector is an example of a such rotationally invariant detector (D.G. Low, «Distinctive Image features from Scale-Invariant keypoints», in J. Comp. Vision, vol. 60, 2004, p91-110). A DOG detector detects blob like local features. These features are the location of high photometric variations along many directions. Square regions of interest R are detected (step DET). Each detected region of interest R is characterized by the spatial location (x,y) of its centre (a point of interest), a possibly scale σ and an orientation angle θ as illustrated in FIG. 3. The expected size of the visual patch PAi and the size of the region of interest R around the point of interest determine the scale of the region of interest R. Next, the visual patch PAi is obtained by extracting a patch, the size of which equals to the size of the region of interest (possibly scaled) and by extending this patch to the expected size of the patch PAi. Once extracted, the visual patch is aligned with respect to the orientation angle θ to achieve the rotational invariant patch nPAi (step NORM).

The orientation angle θ is computed by computing a gradients orientations histogram within the visual patch PAi using a given number of bins N such that the $i^{th}$ component of such histogram is given by:

$$H_{x,y,\sigma}(i) = \mathrm{card}\left(\left\{(x', y') \,\Big|\, x' \in \left[-\frac{W}{2}; \frac{W}{2}\right], y' \in \left[-\frac{W}{2}; \frac{W}{2}\right], \left\lfloor \frac{\Phi(x', y')}{2\pi} * N \right\rfloor = i\right\}\right)$$

where W is the dimension of the patch PAi (or nPAi) which is possibly proportional to a scale σ, card is the cardinality operator, Φ(x',y') denotes the orientation associated to the gradient vector orientation in the interval [0,2π[ at a location (x',y') and ⌊ ⌋ is the round operator. Next, the orientation angle θ of the point of interest is the highest peak of a gradients orientations histogram within the neighbourhood, i.e. given by:

$$\theta(x, y) = \frac{2\pi}{N} * \underset{i \in [0, \ldots, N-1]}{\mathrm{argmax}} (H_{x,y,\sigma}(i))$$

Moreover, when the features $\lambda_A$ and $\lambda_B$ are the gray level averages values, they are defined according to this preferred embodiment by:

$$\begin{cases} \lambda_A = \frac{2}{W^2} * \sum_{(x',y') = [-\frac{W}{2};\frac{W}{2}] \times [-\frac{W}{2};0]} G(x', y') \\ \lambda_B = \frac{2}{W^2} * \sum_{(x',y') = [-\frac{W}{2};\frac{W}{2}] \times [0;\frac{W}{2}]} G(x', y') \end{cases}$$

According to an embodiment, the visual patch is extracted from the image by a rotation invariant detector, the orientation direction ODi is then obtained from a process which is independent of the detector, and the features (or the couple of features according to an embodiment) are computed once the extracted patch has been aligned with an orientation angle θ resulting of the rotation invariant detector.

According to another aspect, the present invention concerns an image indexing method in which at least one point of interest of an image is detected and a descriptor is obtained for each detected point of interest by scanning an extracted patch around said detected point of interest according to a scanning path. The method is characterized in that the extracted patch is normalized according to the above-described method to obtain an arbitrary axial symmetry invariant descriptor.

According to an embodiment, the entire image may be taken as a visual patch and normalized against arbitrary axial symmetry, the orientation direction ODi being then computed on the entire visual patch.

Preferably, multiple points of interest are extracted from the image, leading to a local description of the image. This leads to a local based signature of the image.

According to another aspect, the present invention concerns an image retrieval method in which a signature of a query image and/or a previously stored signature of an image I is/are formed by at least one descriptor which has been normalized according to the above-described method to obtain an arbitrary axial symmetry invariant descriptor.

According to yet another aspect, the present invention concerns an apparatus AP1 which comprises means for implementing the above-described method to obtain an arbitrary axial symmetry invariant descriptor.

According to another aspect, the present invention concerns an apparatus AP2 which comprises means for implementing the above-described indexing method and/or the above-mentioned retrieval method.

The means of apparatus AP1 and AP2 may be programming electronic sets comprising memories and processors or the like. For example, AP1 and AP2 may be a computer which programs the instructions which implement the above-mentioned methods.

The invention claimed is:

1. A method for obtaining a descriptor that is invariant to arbitrary axial symmetries from a visual patch around a detected point of interest of an image, the method comprising:
   extracting, by a computer, a visual patch around a detected point of interest of said image;
   obtaining an orientation direction of the point of interest;
   computing a polarity of the point of interest which defines the location of a scanning path starting point from the orientation direction;
   if the computed polarity does not conform to a predefined polarity, mirroring the extracted visual patch with respect to the orientation direction; and,
   extracting said descriptor that is invariant to arbitrary axial symmetries by scanning the visual patch according to the scanning path, thereby allowing retrieving or indexing an image in an image retrieving or indexing method.

2. The method as claimed in claim 1, wherein a polarity of the point of interest is computed by dividing the visual patch into a plurality of parts and by computing statistical features from these parts, said statistical features defining the location of the scanning path starting point from the orientation direction.

3. The method as claimed in claim 2, wherein the visual patch is divided into two non-overlapping parts separated by the orientation direction, a couple of features is computed from these two non-overlapping parts, a hierarchical relation between the two computed features of said couple is defined, and the computed polarity does not conform to the predefined polarity when the two computed features which defined said computed polarity do not check said hierarchical relation.

4. The Method as claimed in claim 2, wherein the visual patch is extracted from the image by a rotation invariant detector, the orientation direction is then obtained from an orientation angle resulting from the rotation invariant detector, and the features are computed once the extracted patch has been aligned with the orientation direction.

5. The method of claim 2, wherein the visual patch is extracted from the image by a rotation invariant detector, the orientation direction is then obtained from a process which is independent of the detector, and the features are computed once the extracted patch has been aligned with the orientation angle resulting of the rotation invariant detector.

6. The method of claim 1, wherein the image is extracted from a video.

7. An image indexing method wherein at least one point of interest of an image is detected and a descriptor is obtained for said image for each detected point of interest by applying the method for obtained a descriptor according to the method of claim 1.

8. An image indexing method as claimed in claim 1, wherein the visual patch is the entire image.

9. The image indexing method as claimed in claim 7 wherein multiple points of interest are extracted from the image.

10. An image retrieval method in which a signature of at least one of a query image and a previously stored signature of an image is formed by at least one descriptor obtained by applying the method for obtaining a descriptor according to according to the method of claim 1.

11. An apparatus comprising a computer programmed to perform a method to obtain a descriptor that is invariant to arbitrary axial symmetries from a visual patch around a detected point of interest of an image, the method that the computer performs comprises:
   extracting a visual patch around a detected point of interest of said image;
   obtaining an orientation direction of the point of interest;
   computing a polarity of the point of interest which defines the location of a scanning path starting point from the orientation direction;

if the computed polarity does not conform to a predefined polarity, mirroring the extracted visual patch with respect to the orientation direction; and, extracting said descriptor that is invariant to arbitrary axial symmetries by scanning the visual patch according to the scanning path, thereby allowing retrieving or indexing an image in an image retrieving or indexing method.

12. An apparatus as claimed in claim 11, wherein the method that the computer performs further comprises implementing an image indexing method wherein at least one point of interest of an image is detected and a descriptor is obtained for said image for each detected point of interest.

13. An apparatus as claimed in claim 11, wherein the method that the computer performs further comprises implementing a method in which a signature of a query image and a previously stored signature of an image is/are formed by at least one descriptor.

* * * * *